US009216688B2

United States Patent
Ansari et al.

(10) Patent No.: US 9,216,688 B2
(45) Date of Patent: Dec. 22, 2015

(54) SYSTEM AND METHOD FOR BLINDZONE OBJECT DETECTION

(71) Applicants: Adil Ansari, Kennesaw, GA (US); Joseph E. Harter, Jr., Kokomo, IN (US)

(72) Inventors: Adil Ansari, Kennesaw, GA (US); Joseph E. Harter, Jr., Kokomo, IN (US)

(*) Notice: Subject to any disclaimer, the term of this patent is extended or adjusted under 35 U.S.C. 154(b) by 155 days.

(21) Appl. No.: 13/835,616

(22) Filed: Mar. 15, 2013

(65) Prior Publication Data

US 2014/0266651 A1  Sep. 18, 2014

(51) Int. Cl.
*B60Q 1/00* (2006.01)
*B60Q 9/00* (2006.01)
*G08G 1/16* (2006.01)

(52) U.S. Cl.
CPC ............... *B60Q 9/008* (2013.01); *G08G 1/167* (2013.01); *G08G 1/166* (2013.01)

(58) Field of Classification Search
CPC ...... B60Q 9/008; B60Q 1/525; G01S 13/931; G06K 9/00805
See application file for complete search history.

(56) References Cited

U.S. PATENT DOCUMENTS

| | | | |
|---|---|---|---|
| 4,136,954 A | 1/1979 | Jamieson | |
| 4,260,980 A | 4/1981 | Bates | |
| 4,321,594 A | 3/1982 | Galvin et al. | |
| 4,906,976 A | 3/1990 | Guscott | |
| 5,668,539 A | 9/1997 | Patchell | |
| 6,470,273 B2 | 10/2002 | Halsted et al. | |
| 6,753,766 B2 | 6/2004 | Patchell | |
| 6,894,608 B1* | 5/2005 | Gunderson | 340/468 |
| 7,148,482 B2 | 12/2006 | Harter, Jr. | |
| 7,548,156 B2 | 6/2009 | Patchell | |
| 7,982,591 B2 | 7/2011 | Jeng et al. | |
| 2008/0231497 A1* | 9/2008 | Sakamoto | 342/70 |
| 2010/0277298 A1 | 11/2010 | Leong et al. | |
| 2012/0143808 A1 | 6/2012 | Karins et al. | |
| 2013/0096731 A1* | 4/2013 | Tamari et al. | 701/1 |
| 2013/0169797 A1* | 7/2013 | Min et al. | 348/135 |

* cited by examiner

*Primary Examiner* — Travis Hunnings
*Assistant Examiner* — Omeed Alizada
(74) *Attorney, Agent, or Firm* — Novak Druce Connolly Bove + Quigg LLP

(57) ABSTRACT

Various embodiments are described herein for a system and method for blindzone obstacle detection for a host vehicle. The system comprises a sensor array configured to generate measurement data for a blindzone of the host vehicle; a blindzone object detector having at least two detectors that are coupled to the sensor array to process the measurement data and generate outputs which are then combined to form a final detection value that is used to detect an object in the blindzone of the host vehicle. An indicator can also be coupled to the blindzone object detector to generate an indication of object detection in the blindzone.

23 Claims, 8 Drawing Sheets

TARGET VEHICLE PASSING HOST VEHICLE

TARGET VEHICLE LOCKED IN STEP WITH HOST VEHICLE

STATIONARY TARGET – TREE SHADE

SHARP SPIKE – GUARD RAIL

SYSTEM AND METHOD FOR BLINDZONE OBJECT DETECTION

FIELD

The various embodiments described herein generally relate to a system and method for detecting objects in a blindzone of a vehicle.

BACKGROUND

One of the greatest problems for an operator of a vehicle is checking to see if there is an object in the blindzone of the vehicle. The blindzone of the vehicle is an area which extends from the rear of either side of the vehicle and cannot be seen by the operator when the operator is looking at either the rear view mirror or the side view mirrors. The difficulty in viewing objects in the blindzone is especially problematic in the event that there is an object in the blindzone and the operator of the vehicle wishes to maneuver the vehicle towards the blindzone (such as when parking the vehicle) or wishes to change lanes while driving.

SUMMARY OF VARIOUS EMBODIMENTS

In one aspect, in at least one embodiment described herein, there is provided a system for blindzone obstacle detection for a host vehicle, wherein the system comprises a sensor array configured to generate measurement data for a blindzone of the host vehicle; a blindzone object detector comprising at least two detectors, the blindzone object detector being coupled to the sensor array to receive the measurement data, to process the measurement data using the at least two detectors and to combine outputs from the at least two detectors to form a final detection value used to detect an object in the blindzone of the host vehicle; and an indicator coupled to the blindzone object detector and being configured to generate an indication of object detection in the blindzone.

In at least one embodiment, the system further comprises an alarm coupled to one of the detector and the indicator, the alarm being configured to generate an alarm signal when the detector detects the object in the blindzone.

In at least one embodiment, the alarm is configured to generate the alarm signal when the host vehicle is travelling at greater than a minimum speed.

In at least one embodiment, the system comprises an early warning alarm that is activated before a detected object enters the blindzone and the early warning alarm has a property that is changed when the detected object enters the blindzone.

In at least one embodiment, the system is operational when an operator of the host vehicle has indicated a desire to change lanes, reverse the host vehicle or move towards the blindzone.

In at least one embodiment, the blindzone object detector comprises at least two of a frequency-based detector, a time-based detector and an image-based detector.

In at least one embodiment, the blindzone object detector comprises a frequency-based detector, a time-based detector and an image-based detector.

In at least one embodiment, the blindzone object detector is configured to apply a weight for an output of each detector, to add up the weights to determine the final detection value, and to compare the final detection value to a threshold value to detect whether an object is in the blindzone, wherein a given weight is based on a likelihood that the output of a given detector corresponds to a detected object in the blindzone.

In at least one embodiment, the frequency-based detector uses a Fast-Fourier Transform.

In at least one embodiment, the time-based detector uses time-correlation and a speed of the host vehicle.

In at least one embodiment, the image-based detector uses histogram-based detection.

In at least one embodiment, the sensor array comprises a thermopile array.

In at least one embodiment, environmental data about the environment of the vehicle is provided to the blindzone object detector and certain parameters of the at least two detectors are augmented based on the environmental data to improve detection of objects in the blindzone.

In at least one embodiment, the environmental data comprises at least one of an indication of whether it is raining, a temperature outside of the vehicle, a time of day, and a level of ambient light.

In at least one embodiment, the blindzone object detector is implemented by hardware.

In at least one embodiment, the blindzone object detector is implemented by software running on at least one processor.

In at least one embodiment, a first portion of the blindzone detector is implemented by hardware and a second portion of the blindzone object detector is implemented by software running on at least one processor.

In one aspect, in at least one embodiment described herein, there is provided a method for blindzone obstacle detection for a vehicle, wherein the method comprises receiving measurement data for a blindzone of the host vehicle from a sensor array; processing the measurement data using the at least two detectors; combining outputs from the at least two detectors to form a final detection value used to detect an object in the blindzone of the host vehicle; and generating an indication of object detection in the blindzone.

In one aspect, in at least one embodiment described herein, there is provided a computer readable medium comprising a plurality of instructions executable on a microprocessor of an electronic device for adapting the electronic device to implement a method of blindzone obstacle detection for a vehicle, wherein the method comprises receiving measurement data for a blindzone of the host vehicle from a sensor array; processing the measurement data using the at least two detectors; combining outputs from at least two detectors to form a final detection value used to detect an object in the blindzone of the host vehicle; and generating an indication of object detection in the blindzone.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which.

DETAILED DESCRIPTION OF THE EMBODIMENTS

Figure 1:
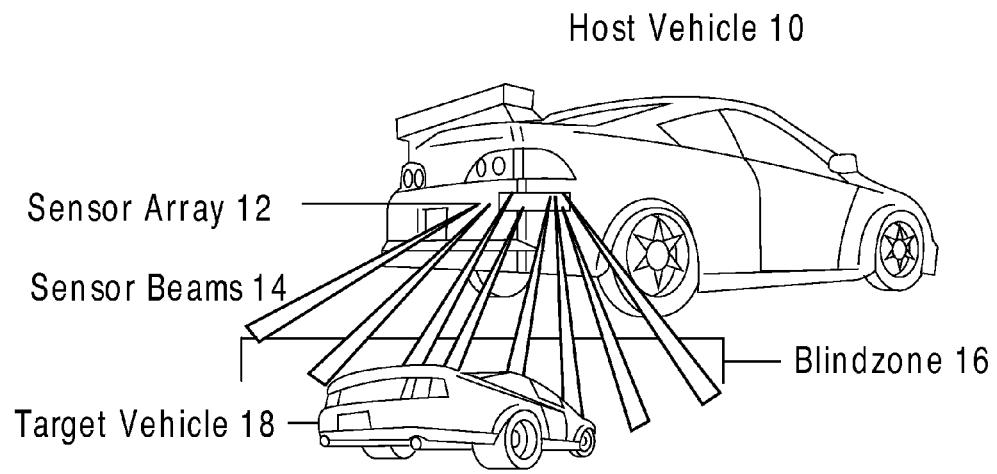
FIG. 1 is an illustration of a vehicle and a blindzone of the vehicle.

Various apparatuses or processes will be described below to provide an example of an embodiment of the claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms coupled or coupling as used herein can have several different meanings depending in the context in which these terms are used. For example, the terms coupled or coupling can have a mechanical, electrical or optical, connotation. For example, depending on the context, the terms coupled or coupling may indicate that two elements or devices can be physically, electrically or optically connected to one another or connected to one another through one or more intermediate elements or devices via a physical, electrical or optical element such as, but not limited to a wire, a fiber optic cable or a waveguide, for example.

It should be noted that terms of degree such as "substantially", "about" and "approximately" as used herein mean a reasonable amount of deviation of the modified term such that the end result is not significantly changed. These terms of degree should be construed as including a deviation of up to ±10% of the modified term if this deviation would not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about." The term "about" means up to plus or minus 10% of the number to which reference is being made.

Furthermore, in the following passages, different aspects of the embodiments are defined in more detail. Each aspect so defined may be combined with any other aspect or aspects unless clearly indicated to the contrary. In particular, any feature indicated as being preferred or advantageous may be combined with at least one other feature or features indicated as being preferred or advantageous where the resulting combination has utility.

Various embodiments are described herein that can be used to detect an object in the blindzone of a vehicle hereafter referred to as a host vehicle. Such objects include, but are not limited to, other vehicles such as cars, trucks, sport-utility vehicles, buses, motorcycles and bikes, for example. Other objects that can be detected in the blindzone of the host vehicle include, but are not limited to, people, animals, and other moving objects. If another vehicle is the object that is in the blindzone, then it is referred to hereafter as a target vehicle (since it is a vehicle that is to be detected).

Referring now to FIG. 1, shown therein is an illustration of a host vehicle 10. The host vehicle 10 includes a multi-sensor device having a sensor array 12 that measures data from a blindzone 16 of the host vehicle 10 in order to monitor the blindzone. In this example embodiment, the data measured by the sensor array 12 is represented by a plurality of sensor beams 14 from the blindzone 16 in order to detect whether an object, such as a target vehicle 18, is in the blindzone 16. Accordingly, it should be understood that there are embodiments in which beams are not generated by the sensor array 12. However, there may be other embodiments in which the sensors of the sensor array 12 operate in a different manner and may generate beams which may be reflected by an object in the blindzone 16, for example. In general, the sensor array 12 can have an n×m configuration where m and n represent a number of rows and columns respectively and the sensors are physically located at a row and column position in the sensor array 12. It should also be noted that in the various embodiments of the apparatuses and methods used for blindzone objection detection, there will be a sensor array for each blindzone area that is to be monitored.

In at least one example embodiment, the sensor array 12 is part of a multi-element thermal sensor device such as, but not limited to, a thermopile, for example. For example, an 8×1 pixel (i.e. sensor element) thermopile can be used. However, in other embodiments, other n×m configuration thermopiles can be used. Each sensor element of the sensor array 12 measures the temperature of a region its field of view (FOV) in the blindzone 16 and generates a voltage that is proportional to the temperature in its FOV. These voltages are then processed to provide measurement data that are then analyzed. Each measured voltage can be considered to be a pixel if it were used to generate an image of any objects that are in the blindzone 16. In at least one embodiment, the region that is monitored can have a length of about 3.7 m on either side of the host vehicle 10 and can range from 0.3 m to 3 m above the ground.

Figure 2:
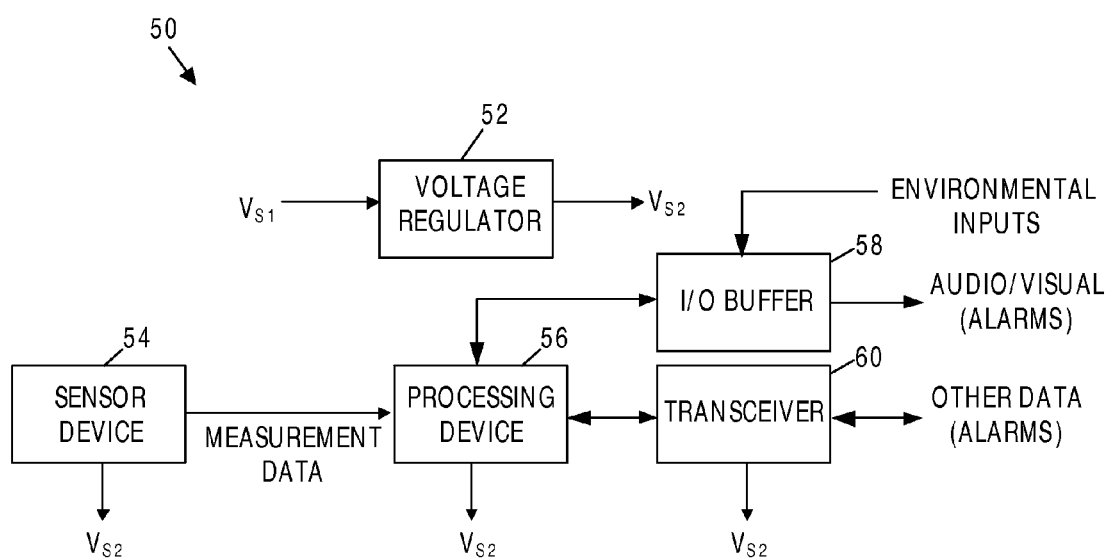
FIG. 2 is a block diagram of an example embodiment of a system that can be used for blindzone object detection for a vehicle.

Referring now to FIG. 2, shown therein is a block diagram of an example embodiment of a system 50 that can be used for blindzone object detection for the host vehicle 10. The system 50 comprises a voltage regulator 52, a sensor device 54, a processing device 56, an I/O buffer 58, and a transceiver 60. The sensor device 54, the I/O buffer 58 and the transceiver 60 are coupled to the processing device 56. In alternative embodiments, other layouts and/or components can be used. For example, there can be some embodiments in which the processing device 56 has a built-in I/O buffer.

In this example embodiment, a single processing device 56 can be used to monitor both the right and left blindzones of the host vehicle 10. In an alternative embodiment, more than one processing device can be used in which each processing device is used to monitor a different blindzone. For simplicity of illustration, the remainder of the description will describe analysis that is performed for one blindzone; however, it should be understood that the same analysis can be conducted for both the left and right rear blindzones. In addition, there can be at least one embodiment in which measurement data from both blindzones are analyzed at the same time. Furthermore, it should be understood that the detection techniques used for the rear left and right blindzone analysis can be adapted for use with other blindzones of the host vehicle 10, such as those that may be at the front right and left sides of the host vehicle 10 that are out of view of the operator of the host vehicle 10.

The sensor device 54 comprises the sensor array 12 as well as electronics that are used to preprocess the voltages generated by the sensor array 12 and generate measurement data that is then processed for object detection. Accordingly, in this example embodiment, the sensor device 54 also comprises amplification circuitry and filtering circuitry that are coupled to the sensor array 12 to amplify and filter the voltages generated by the sensor array 12. The amplification circuitry and filtering circuitry are not shown but their design is known to those skilled in the art. In at least some embodiments, other pre-processing techniques can also be used such as, but not limited to, at least one of oversampling and averaging, for example, which will improve the signal to noise ratio. In at least some embodiments, Kalman filtering may be used alone or with at least one of averaging and oversampling in order to obtain a good signal estimate in the presence of noise.

The format of the measurement data can vary depending on the implementation of the processing device 56. For example, if the processing device 56 is a Digital Signal Processor (DSP), a controller or another electronic device that operates on digital data, then the sensor device 54 may include an Analog to Digital Converter (ADC) (not shown) that processes the output of the amplification and filtering circuitry to generate digital measurement data. For example, in at least one embodiment, the sensor device 54 can provide measurement data using the I²C bus communication protocol. In alternative embodiments, the ADC can be a standalone device or it can be included as part of the processing device 56. In alternative embodiments, the processing device 56 may comprise analog circuitry that provides the required processing functions in which case the measurement data does not need to be digitized.

The measurement data is processed by the processing device 56 using at least two separate detection techniques whose outputs are then combined using a fusion detection technique. In at least one embodiment, three separate detection techniques can be used by the processing device 56 and the outputs of these three separate detection techniques can be combined using a fusion detection technique. The output of the fusion detection technique then indicates whether an object has been detected in the blindzone 16. The processing device 56 can be implemented using a processor, a controller, an Application Specific Integrated Circuit (ASIC), at least one of discrete analog circuitry and digital circuitry, and the like.

The I/O buffer 58 is coupled to the processing device 56 and receives an indication signal from the processing device 56 as to whether an object is detected in the blindzone 16. The I/O buffer 58 is also coupled to an audio alarm, a visual alarm or both an audio alarm and a visual alarm to transmit the indication signal thereto in order to alert the operator of the host vehicle 10 of the detected object in the blindzone 16.

In at least some embodiments, the I/O buffer 58 can also be coupled to receive environment data from at least one vehicle sensor. The environment data is then sent to the processing device 56 to be used in one of the detection techniques. For example, the environment data can include vehicle speed that can be used by a time-based detector. The environmental data can further include at least one of an indication of whether it is raining (i.e. the windshield wiper is active), the temperature outside of the host vehicle 10, the time of day, and the like. The environmental data can be used to improve target detection, by changing the values of detection thresholds or other parameters used by the detectors, for example. The environmental data can also be used to warn of poor detection conditions.

The transceiver 60 is used for communication purposes and can be implemented in different ways. For example, in at least one embodiment, the transceiver 60 is a Control Area Network (CAN) transceiver that interfaces with a CAN bus to transmit and receive CAN data. This is actually a standard practice in automotive data communication. The CAN data can be alarm information that is communicated via the CAN bus or the discrete I/O buffer in order to turn on an annunciator.

The voltage regulator 52 is coupled to most of the components of the system 50 to provide power to these components. The voltage regulator 52 receives a voltage $V_{S1}$ from a power source such as, but not limited to, a battery, a fuel cell, an AC adapter, a DC adapter, a USB adapter, a battery, a solar cell or any other power source, for example, and converts the voltage $V_{S1}$ to another voltage $V_{S2}$ which is then used to power the components of the system 50. The voltage regulator 52 can be implemented in a variety of different ways depending on the voltages $V_{S1}$ and $V_{S2}$ and the current and power requirements of the components of the system 50 as is known by those skilled in the art.

Figure 3:
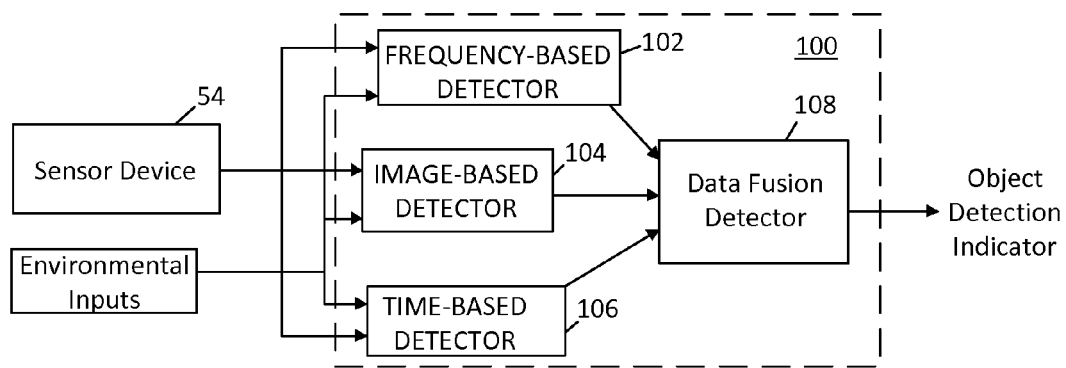
FIG. 3 is a block diagram showing the functional blocks of a blindzone object detection method.

Referring now to FIG. 3, shown therein is a block diagram showing the functional blocks of an example embodiment of a blindzone object detector 100. The blindzone object detector 100 comprises a frequency-based detector 102, an image-based detector 104, a time-based detector 106 and a data fusion detector 108. The detectors 102 to 106 receive measurement data about the blindzone 16 as well as environmental inputs as explained previously. The data fusion detector 108 receives the detection outputs from the detectors 102 to 106 and combines these detection outputs to determine a final detection value that is then used to generate an object detection indicator. Each of the detectors 102 to 106 has their own merit in terms of target discrimination in certain conditions. The combination of the detector outputs from the detectors 102 to 106 increases the accuracy and robustness of the blindzone object detector 100, which will therefore provide object detection with a higher level of confidence. However, there can be other embodiments in which only two of the detectors 102 to 106 are used.

The detector outputs from the detectors 102 to 106 can be combined in a variety of ways. For example, each of the detector outputs from the detectors 102 to 106 can be assigned a weight before being combined. In at least some cases, the value of the weight is selected based on the likelihood that the detector output represents a detected object in the blindzone 16. In other words, the weighting scheme can be designed to indicate the confidence level for the detection outputs of each of the detectors 102 to 106 in at least some embodiments. For example, if weights are used with values from 0 to 10, a weight of 0 represents no confidence in a detector output and a weight of 10 represents the highest confidence in a detector output. The confidence level can be determined by looking at various characteristics of a given detector output as is explained in the examples of FIGS. 9A-9D. The aggregated weight representing the final detection value can then be compared against a threshold value to determine if there is a target vehicle in the blindzone 16.

Alternatively, in at least one embodiment, the data fusion detector 108 can select which detector outputs to use based on the environmental inputs as one of the frequency-based detector 102, the image-based detector 104 and the time-based detector 106 may be optional under different environmental conditions for various reasons such as, but not limited to, not being as reliable in certain conditions, for example. In at least one embodiment, this can also be achieved by selecting a weight of zero for the detector output for a particular detector that does not give a reliable output in certain conditions.

In alternative embodiments, there can be other combinations of the detectors 102 to 106 that can be used. For example, in at least one embodiment, only the frequency-based detector 102 and the image-based detector 104 are used. Alternatively, in at least one embodiment, only the frequency-based detector 102 and the time-based detector 106 are used. Alternatively, in at least one embodiment, only the image-based detector 104 and the time-based detector 106 are used.

In alternative embodiments, there can be more than three detectors that are used. For example, in at least one embodiment a wave shape detector can be used to improve the performance of the blindzone object detector 100. The wave shape detector can be used to measure the slope of the signals generated by the sensor array 12, which can then be used to detect moving objects in the blindzone 16. For example, for vehicles that are travelling in the blindzone 16 with a small relative velocity with respect to the host vehicle 16, the change (e.g. slope) of measured temperature versus time (e.g. dTh/dt) will be low (the variable Th represents the temperature from a thermal sensor such as a thermopile). In contrast, the change of measured temperature versus time for faster vehicles travelling in the blindzone 16, oncoming traffic, or stationary objects will be larger and sometime very high.

In at least one embodiment, the blindzone detector 100 uses a single type of detector element (for example thermopile sensors) which results in a simpler, less expensive processing strategy. This is in contrast to conventional detectors which merge data from different types of sensors to monitor the blindzones, which often results in complex and expensive implementations.

The frequency-based detector 102 performs a frequency-based analysis of the measurement data for the blindzone 16. A wide variety of frequency analysis techniques can be used. For example, in at least one embodiment described herein, a Fast Fourier Transform (FFT) can be used to perform frequency analysis of the measurement data. In alternative embodiments, other frequency analysis techniques can be used such as, but not limited to, FFT-Based Maximum Likelihood Estimation, for example.

The k-point FFT can be determined according to equation 1 for a given sensor element:

$$X(k) = \Sigma x(n) * W_n^{kn} \quad (1)$$

in which X(k) is the FFT coefficient at frequency k, x(n) is the measurement data for the given sensor element at time instant n, and $W_n$ is the frequency weight for frequency k and time point n. Larger values of k and n require more computational effort. In at least one embodiment, a 32-point FFT can be used to provide an adequate estimate of the frequency content of the measurement data.

The values that are computed for various frequencies by the frequency-based detector 102 will give a good indication if there is a moving, stationary or oncoming target in the blindzone 16. The FFT measures amplitudes for frequencies from DC (i.e. zero frequency) to Fs/2, where Fs is the sampling frequency that is used by the ADC. The sampling frequency can be chosen to be in the range of 1 KHz to 10 KHz in which case amplitudes can be measured for frequency components from 0 to 500 Hz or up to 5 KHz. In at least one example embodiment, every sampling period (e.g. 1 ms for a 1 kHz sampling rate) all n×m pixels will be read and so 32 samples of each pixel (e.g. sensor) will be read every 32 msec. The FFT will then be performed on the 32 samples. Alternatively, for higher frequency resolutions, 64 or 128 samples can be read for a 64-point or 128-point FFT analysis, respectively.

For a target vehicle 18 that moves into and out of the blindzone 16, the frequency content of the measurement data that corresponds to the target vehicle 18 is typically less than 100 Hz because the relative speed between the host vehicle 10 and the target vehicle 18 in the blindzone 16 is fairly low. However, for stationary targets or oncoming vehicles in the blindzone 16, the relative speed will be much higher and therefore, the signals that are generated by the sensor elements will be fast changing and will therefore have higher frequency components.

Accordingly, if there are low frequency signals in the measurement data for most of the sensor elements then this is a good indication of a moving target vehicle in the blindzone 16 with a high confidence level. Accordingly, in this case, a weight of 8 to 10 out of 10 can be assigned to the output of the frequency-based detector 102 indicating a moving target vehicle in the blindzone 16. Conversely, for higher frequency components in the measurement data of each sensor element, a low weight can be assigned. It should be noted that in some cases for the frequency-based detector 102, even one sensor is sufficient to indicate a target vehicle 18 in the blindzone 16. This will be the case when a target vehicle 18 is just entering the blindzone 16. However, this sensor will have to show a sustained signal in order to detect the target vehicle.

The image-based detector 104 performs an image-based analysis of the measurement data for the blindzone 16. A wide variety of image-based analysis techniques can be used. For example, in at least one embodiment described herein, a histogram method can be used to perform image analysis of the measurement data. In alternative embodiments, other image processing techniques can be used such as, but not limited to, edge detection, morphological segmentation, and the like, for example. The histogram of an image refers to a histogram of the image values. A histogram analysis can be done according to equation 2:

$$Y(k) = \text{Freq}(\text{Matrix}(x(n))) \quad (2)$$

where Y(k) is the frequency of occurrence of a certain pixel value (i.e. a certain voltage value from a sensor element) and x(n) is the voltage value of the $n^{th}$ pixel (e.g. sensor element). For example, for an 8-bit gray scale image there are $2^8=256$ different possible intensities, and so the histogram will graphically display 256 numbers showing the distribution of pixels amongst those gray scale values. In the case of a thermal sensor, the voltage value relates to a certain temperature value. The histogram is a graph showing the number of pixels in an image at each different intensity value found in that image. For example, if 8 discrete intensity levels are used per pixel, then the pixel voltages read as a function of the temperature intensities are grouped together in one of the 8 intensity bins. In at least one example embodiment, all sensor values are read every 1 ms (for a 1 KHz sampling rate) and the samples are then fed to the 3 detectors 102 to 106 simultaneously or in parallel depending on the particular implementation. Therefore, there can be embodiments in which the same measurement data is processed by all three detectors 102 to 106. Alternatively, there may be cases where different measurement data is processed by all three detectors 102 to 106.

In the image-based detector 104, measurement data from all of the sensor elements will be used to generate an image of the blindzone. If the generated image follows a certain pattern that resembles a vehicle and the image does not exhibit a random pattern as in the case of clutter, then a high weight can be assigned as the output of the image-based detector 104. By comparing Y(k) to known patterns for target vehicles, target vehicles can be discriminated from other objects in the blindzones. For example, if the histogram shows a sustained peak for higher intensities indicating a slow moving target, then a weight of 9 can be used to indicate a moving target vehicle 18 in the blindzone 16. If the histogram shows well distributed temperatures for all of the sensors, this would mean that there is no target vehicle 18 in the blindzone 16 and a low weight of (e.g. 3) can be assigned.

Alternatively, in at least one embodiment, in order to determine if the generated image has a pattern that resembles a vehicle, the histogram method is used since different histograms will exist for different vehicles. The histogram of the measurement data is generated during use and compared to a database of histograms of different target vehicles moving in the blindzone 16. This comparison can be done by using a correlation function, for example. A high correlation means that there is a greater likelihood of an object being in the blindzone 16 which calls for a higher weight. For clutter, stationary targets, and the like in the blindzone 16, the correlation will be low which calls for a lower weight. The database can also include histograms of different target vehicles obtained under different speed conditions of the host vehicle 10 and other different environmental conditions. This database is pre-determined, which means that data for the database has been determined prior to being used by the blindzone detector 100. In at least one embodiment, the speed of the host vehicle 10 can be used to adjust the threshold used in histogram analysis For example, to increase detectability, the threshold will be a lower value at higher vehicle speeds and a higher value at lower vehicle speeds.

The time-based detector 106 performs a time-based analysis of the measurement data for the blindzone 16. A wide variety of time-based analysis techniques can be used. For example, in at least one embodiment described herein, a time shift correlation method can be used to perform time-based analysis of the measurement data. The time-shift correlation function uses the speed of the host vehicle 10 to determine a time-shift correlation between the measurement data of any two sensor elements from the sensor device 54. For example, in at least one embodiment the time-shift correlation can be determined on a pair-wise basis for all adjacent sensor elements and/or other pairwise combinations of the sensor elements. In at least one alternative embodiment, the time-based detection can be made adaptive. For example, in cases where the frequency-based detector 102 and the image-based detector 104 give a high probability of target detection, then measurement data from only 2 pairs of sensors can be correlated to save computing time and also reduce power consumption. An example of this determination is shown in equation 3 for sensors 1 and 2 of the sensor array 12:

$$p(t)=\Sigma X_1(nT)*X_2(nT+\tau)\ n=0,1,\ldots 31 \quad (3)$$

where T is the sample time, $X_1(nT)$ is measurement data from sensor element 1 at time index n, $\tau$ is the time shift determined from vehicle speed, $X_2(nT+\tau)$ is measurement data from sensor element 2 shifted by $\tau$ which is determined based on the vehicle speed of the host vehicle 10 and p(t) is the correlation value. In other words, from the host vehicle 10, one can determine the amount of time that it would take for a spot on the road for a given pixel (i.e. sensor element) of the sensor device 54 to move to the spot on the road for another pixel (i.e. sensor element).

For a vehicle passing in the blindzone 16, the time-shift correlation value p(t) for measurement data between adjacent sensors will be low compared to that of a stationary target or clutter in the blindzone 16 in which case the time-shift correlation value p(t) for measurement data between adjacent sensors will be very high. Accordingly, if the time-shift correlation function provides a low correlation value, then a high weight of 8-10 is assigned. Therefore, the time-shift correlation function should provide a good discrimination between stationary and moving targets in the blindzone 16.

In the case of a moving vehicle in the blindzone dead locked in speed, the correlation function will be very high. In this case the frequency and histogram methods will give a high confidence value.

The data fusion detector 108 receives the detector outputs from each of the detectors 102 to 106 and applies weights as explained earlier which are then combined to determine a final detection value. For each of the detectors 102 to 106, the actual technique used to assign the weights can be determined experimentally in order to achieve a desired hit rate and a desired false alarm rate under different conditions. The final detection value is then compared to a threshold value to determine whether an object has been detected in the blindzone 16. The result of this comparison is then conveyed to the object detection indicator, which may be at least one of an audio alarm and a visual alarm for presenting the object indication to the operator of the host vehicle 10.

It should be noted that while the blindzone detector 100 is shown as comprising three detectors 102 to 106, these detectors can be implemented by the same element (i.e. processing device 56) in which case the element performs the detection methods that correspond to the detectors 102 to 106.

Figure 4:
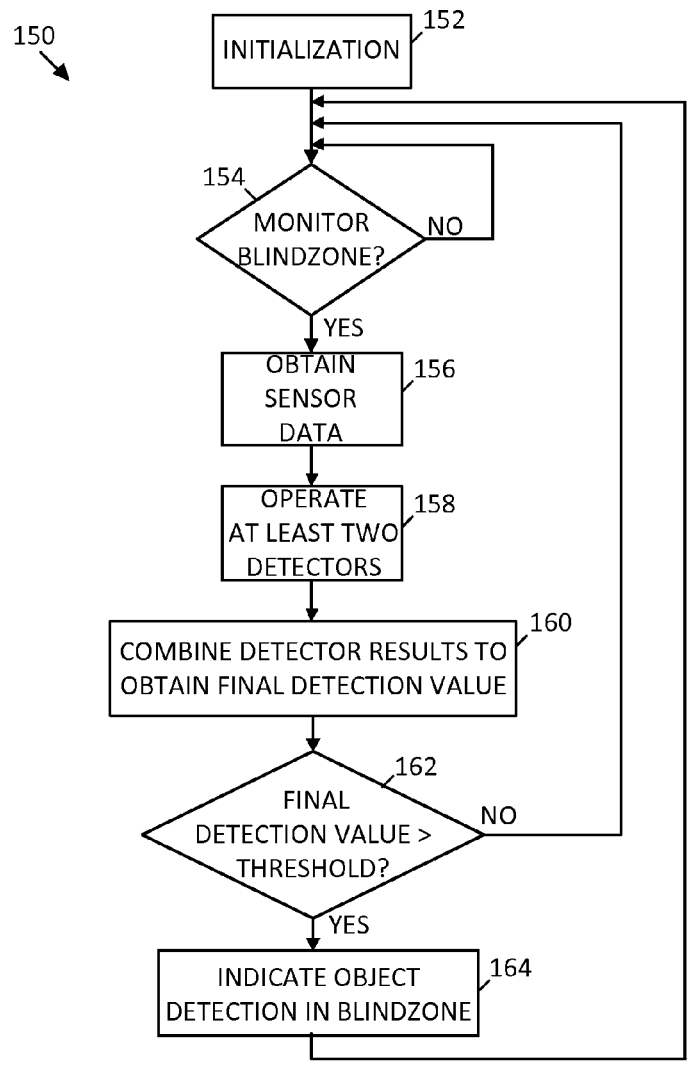
FIG. 4 is a flowchart of an example embodiment of a blindzone object detection method.

Referring now to FIG. 4, shown therein is a flowchart of an example embodiment of a blindzone object detection method 150. At 152, the blindzone detector is initialized. This includes setting values for various detection parameters and possibly doing some calibration. As explained previously, in at least some embodiments, values for the parameters of at least one of the detectors 102 to 106 can be modified depending on the value of certain environmental information parameters to improve target detection (i.e. increase the hit rate and/or decrease the false alarm rate) and also warn of poor detection conditions. For example, the environmental data about the environmental conditions can further include at least one of an indication of whether it is raining (i.e. the windshield wiper is active), the temperature outside of the host vehicle 10, the time of day, if a turn signal is on, the level of ambient light and the like. This information can be obtained from vehicle sensors that are part of the vehicle. In some embodiments, additional sensors have to be added to obtain this information such as light sensors, for example. For example, different road conditions reflect a different amount of light and therefore have different heat signatures which may make it easier or more difficult to detect objects in the blindzone 16. For instance, on a colder day it is easier to detect the target vehicle 16. However, on a hot, sunny day there may be more thermal contrast between the target vehicle 16 and the road. Accordingly, for hot and cold conditions, no additional adjustment of the detection thresholds may be required because the contrast between vehicles in the blindzone 16 and the road surface will be significantly high. For more benign conditions such as a rainy day, the wiper on signal, if available, can be used to lower the detection thresholds which would increase the detectability of objects in the blindzone 16 with the tradeoff being that the false alarms are increased. However, in benign conditions, while there is less contrast, the heat generated from a target vehicle may result in more heat contrast that is more easily detected.

At 154, the detection method 150 determines whether the blindzone should be monitored. As explained previously, in at least some embodiments, blindzone detection can be operational only when the operator of the host vehicle 10 intends to reverse or turn the host vehicle 10. In this case, the sensor array 12 can always be operational and blindzone object detection is triggered when a turn signal for the host vehicle 10 is activated. Alternatively, in other embodiments, the sensor array 12 can be activated when the turn signal for the host vehicle 10 is activated. Both of these implementations are advantageous (the latter being more advantageous than the former) for reducing power consumption as well as preventing the presentation of object detection for objects that move through the blindzone 16 when the host operator is not intending on moving the host vehicle 10 to another driving lane or towards the blindzone 16. If the blindzone 16 is to be monitored, then the method 150 goes to 156; otherwise the method 150 continues to check when the blindzone 16 should be monitored.

At 156, the sensor device 54 is activated in order to obtain measurement data. The method 150 then operates at least two of the detectors 102, 104 and 106. As described previously, an example of when only two of the detectors 102, 104 and 106 may be operated is when one of the detectors 102, 104 and 106 does not provide dependable data due to the current environmental conditions. The detectors that are operational generate detection outputs once enough measurement data has been collected.

When each of the operational detectors generates a detection output the method 150 goes to 160 at which point the detector outputs are combined by the fusion detector 108 to determine a final detection value. The combination can be done using the weighting scheme described previously.

At 162, the final detection value is compared to a threshold value to determine if an object has been detected in the blindzone 16. In at least some embodiments, the threshold value is adjusted for certain environmental conditions. This adjustment can be determined experimentally in order to achieve the desired hit rate and false alarm rate under the different conditions. In general, if a large weight is given to detector outputs of the detectors 102 to 106 when they detect an object in the blindzone 16, then the final detection value is checked to see if it is larger than the threshold value which indicates that an object has been detected. In other embodiments, other scoring and comparison methods can be used to determine if an object has been detected.

If an object has been detected at 162, then the method 150 goes to 164 at which point object detection is indicated to the operator of the host vehicle 10. Otherwise, if an object has not been detected at 162, the method 150 goes to 154 to continue to monitor the blindzone 16.

In at least one embodiment, an alarm is activated when an object, such as the target vehicle 18, has been detected in the blindzone 16. Alternatively, in at least one embodiment, there can be a minimum speed that the host vehicle 10 is travelling at in order for an alarm to be reported. For example, this minimum host vehicle speed can be 30 mph in some cases.

Alternatively, in embodiments in which the sensors have a greater range and can be directed to regions that are further behind the host vehicle 10, an early warning alarm can be turned on. In these embodiments, it may be possible to have a different symbol and/or a different color for an early warning alarm versus the regular alarm that is triggered for object detection within the blindzone 16.

Alternatively, in at least one embodiment, there can be more than one color and/or symbol that are used for the alarm and the one that is chosen depends on the distance of the detected object from the host vehicle 10. For example, an early warning indication can be used which displays an icon and changes the color of the icon when a target vehicle 18 is about to enter the blindzone 16 of the host vehicle 10. In this case, the color may be orange when the target vehicle 18 is detected outside of the blindzone 16 and is then changed to red when the target vehicle 18 is in the actual blindzone 16 of the host vehicle 10. Alternatively, or in addition thereto, unique sounds can be used for an audible alarm that correspond to the different colors that are used for a visual alarm.

Figure 5:
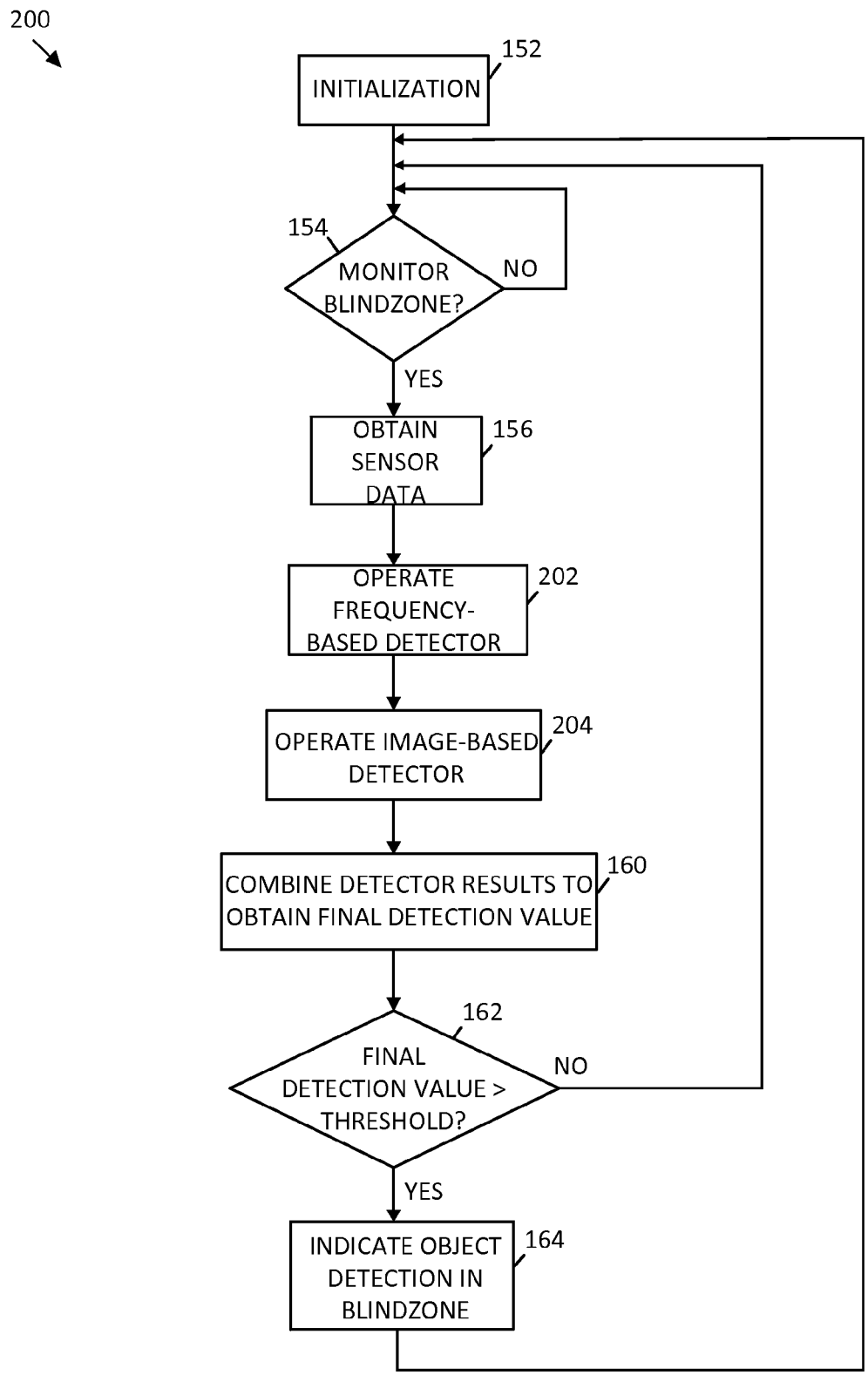
FIG. 5 is a flowchart of an example embodiment of another blindzone object detection method.

Referring now to FIG. 5, shown therein is a flowchart of an example embodiment of another blindzone object detection method 200. The blindzone object detection method 200 is similar to the blindzone object detection method 150 but it specifies that the frequency-based detector 102 and the image-based detector 104 are used at 202 and 204, respectively, to determine detector outputs that are then combined by the data fusion detector 108 at 160.

Figure 6:
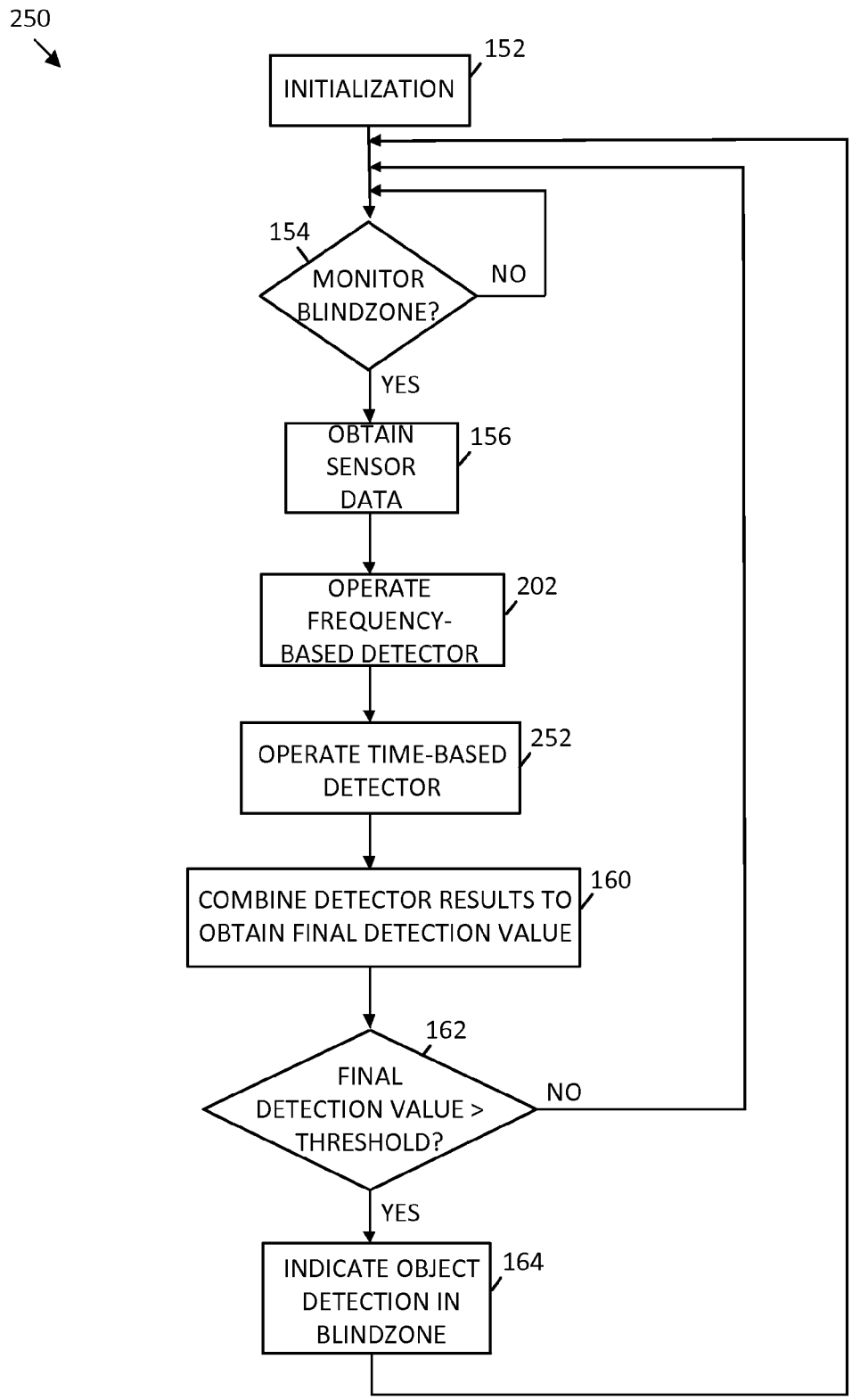
FIG. 6 is a flowchart of an example embodiment of another blindzone object detection method.

Referring now to FIG. 6, shown therein is a flowchart of an example embodiment of another blindzone object detection method 250. The blindzone object detection method 250 is similar to the blindzone object detection method 150 but it specifies that the frequency-based detector 102 and the time-based detector 106 are used at 202 and 252, respectively, to determine detector outputs that are then combined by the data fusion detector 108 at 160.

Figure 7:
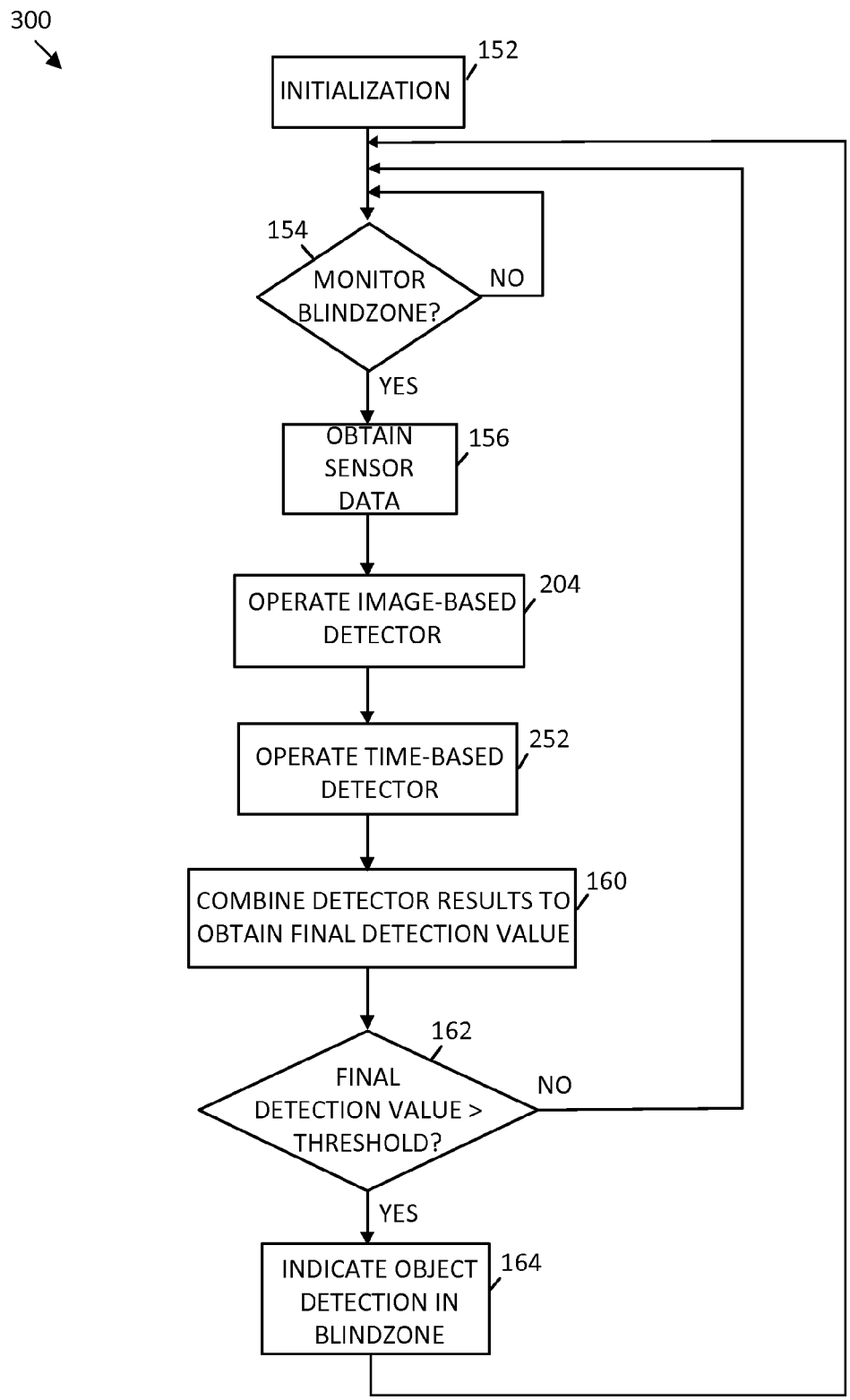
FIG. 7 is a flowchart of an example embodiment of another blindzone object detection method.

Referring now to FIG. 7, shown therein is a flowchart of an example embodiment of another blindzone object detection method 300. The blindzone object detection method 300 is similar to the blindzone object detection method 150 but it specifies that the image-based detector 104 and the time-based detector 104 are used at 204 and 252, respectively, to determine detector outputs that are then combined by the data fusion detector 108 at 160.

Figure 8:
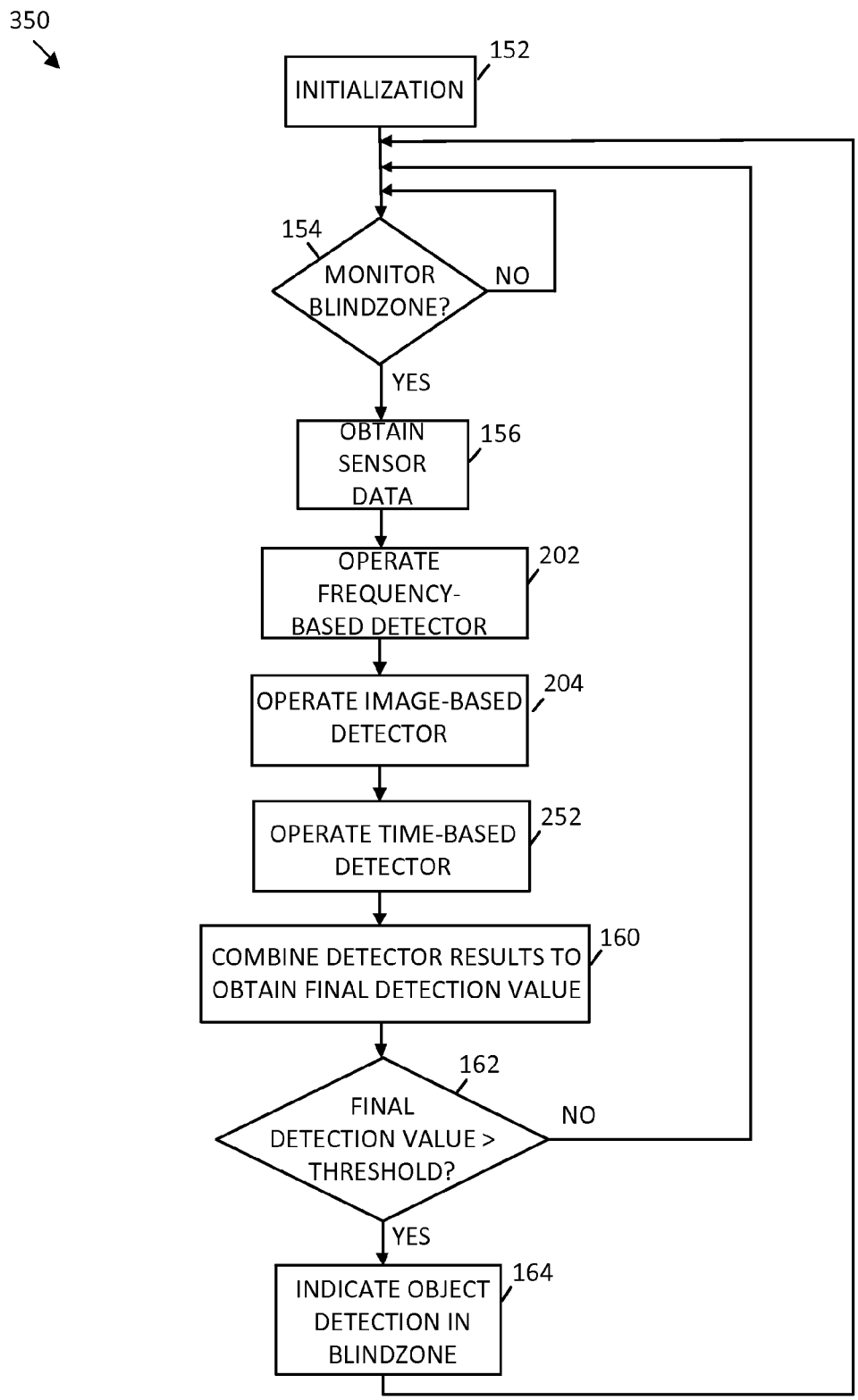
FIG. 8 is a flowchart of an example embodiment of another blindzone object detection method.

Referring now to FIG. 8, shown therein is a flowchart of an example embodiment of another blindzone object detection method 350. The blindzone object detection method 350 is similar to the blindzone object detection method 150 but it specifies that the frequency-based detector 102, the image-based detector 104 and the time-based detector 106 are used at 202, 204 and 252, respectively, to determine detector outputs that are then combined by the data fusion detector 108 at 160.

Figure 9A:
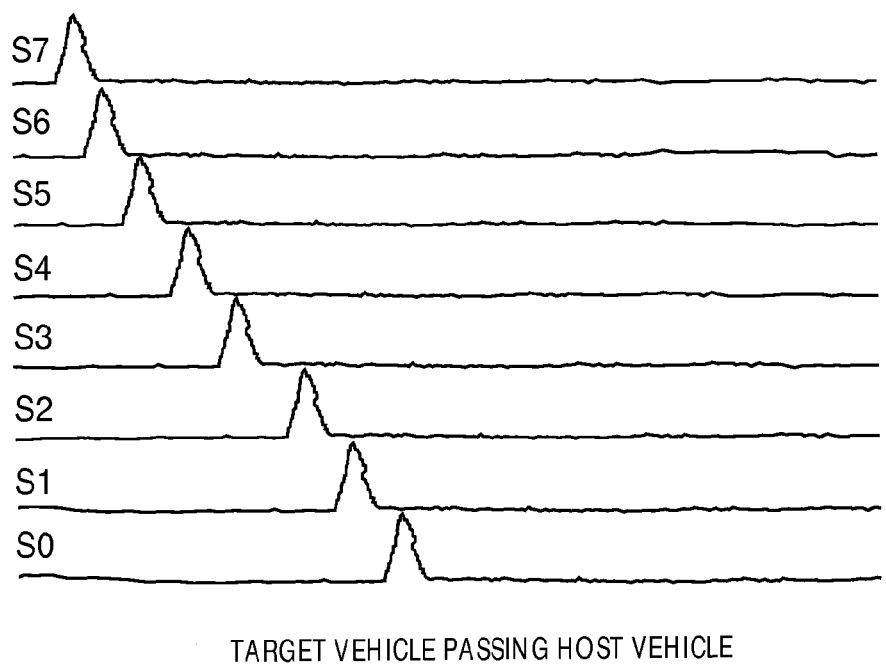
FIGS. 9A-9D show examples of sensor output data that can be used for blindzone object detection in a variety of situations.
Figure 9B:
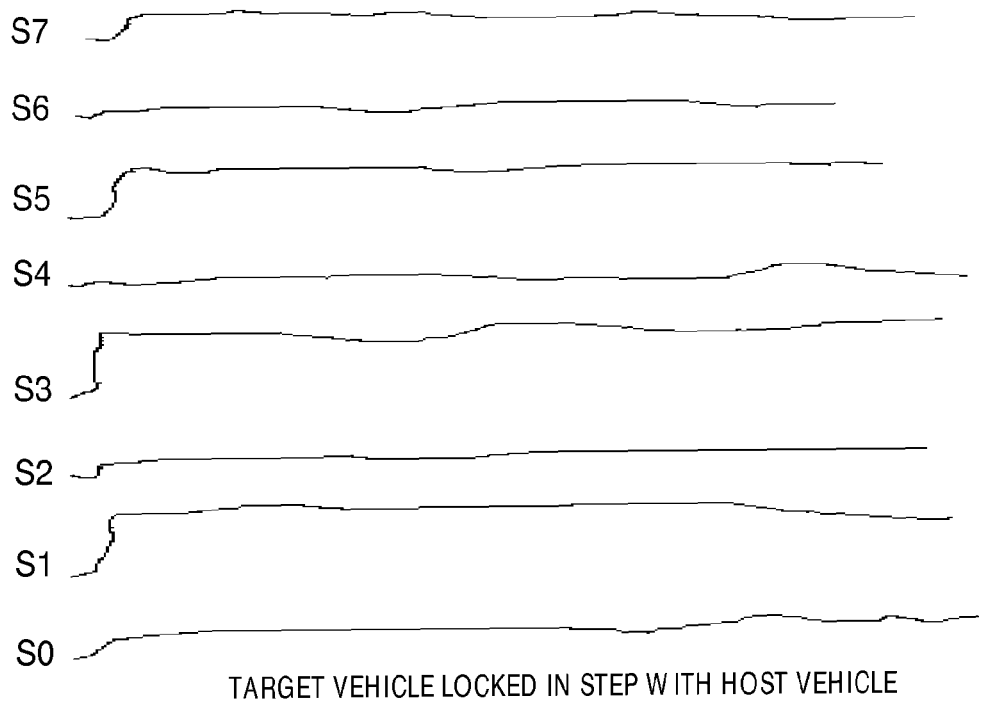
Figure 9C:
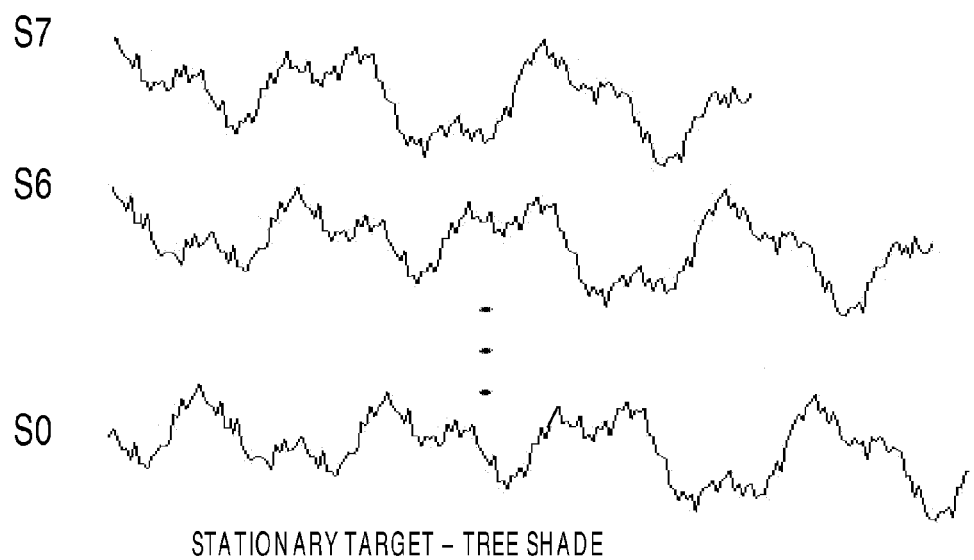
Figure 9D:
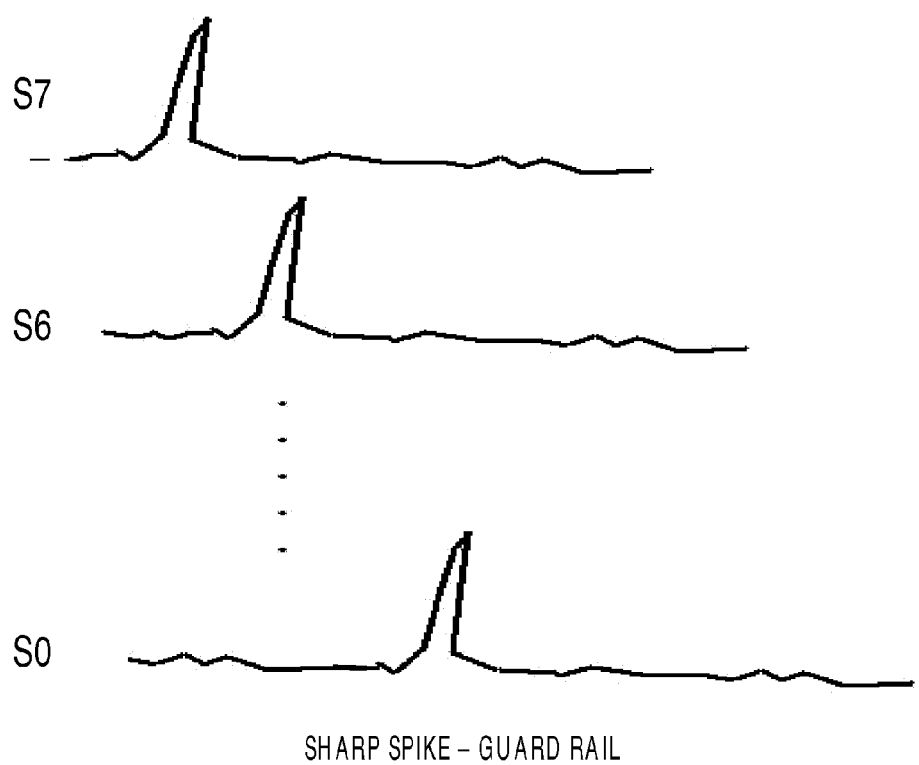

Referring now to FIGS. 9A-9D, shown therein are examples of sensor output data that are used for blindzone object detection in a variety of situations. FIG. 9A shows outputs of the sensor elements when a target vehicle 18 in the blindzone 16 is passing the host vehicle 10. FIG. 9B shows outputs of the sensor elements when a target vehicle 18 in the blindzone 16 is locked in step with (i.e. travelling at the same speed as) the host vehicle 10. FIG. 9C shows typical outputs of the sensor elements for a stationary target in the blindzone 16, which in this example is tree shade. FIG. 9D shows outputs of the sensor elements when there is a guard rail in the blindzone 16. As can be seen, these cases result in different output values for the sensor elements and possibly different output values for adjacent sensor elements depending on the situation. For each of these examples, the sensors are thermal sensors, such as those found in a thermopile.

Referring again to FIG. 9A, when there is a target vehicle 18 in the blindzone 16 that is passing the host vehicle 10, all of the output signals of the sensor elements are very similar. In this case, the frequency-based detector 102 will detect low frequency components in the measurement data. If any of the sensor elements, numbered S0 to S7, has low frequency components and these low frequency components are close to one another across the sensors S0 to S7, then a high weight (i.e. 8 to 10) can be assigned for the detector output of the frequency-based detector 102.

In the case where there is a target vehicle 18 in the blindzone 16 that is going to be passing the host vehicle 10, there may be situations in which some sensor elements generate measurement data that appears to be clutter and the rest of the sensor elements generate measurement data that appears to be a target vehicle. In this case, the frequency-based detector 102 will typically detect both high and low frequency components in the measurement data generated by the sensor elements. A high weight (e.g. 8 to 10) can be assigned for the frequency-based detector 102. In this case, the measurement data generated by the sensors elements will result in image data that does not have a very conclusive pattern to detect a target vehicle moving in the blindzone 16 since part of the histogram will match a pre-determined target vehicle image for measurement data from some of the sensors but not for the other sensors. Therefore, a low weight (e.g. 0 to 2) can be assigned for the output of the image-based detector 104. In this case, the time-based detector 106 will generate a low correlation value for measurement data between adjacent sensors because the measurement data appears to be random for target vehicles moving in the blindzone 16. Therefore, a high weight (e.g. 8 to 10) can be assigned to the output of the time-based detector 106. The cumulative weight for this case is in the range of 16 to 22, which is high, and an object will be detected in the blindzone 16.

Referring again to FIG. 9B, when there is a target vehicle in the blindzone 16 that is travelling at about the same speed as the host vehicle, the measurement data provided by each of the sensors are fairly constant across time. In this case, the frequency components of the measurement data for each sensor will be fairly low. The signal variation due to vehicles bouncing as well as measurement data due to the ground and other light reflections will be at a minimum. If any of the sensor elements generate measurement data with predominantly low frequency components, then a high weight (e.g. 8-10) can be assigned for the frequency-based detector 102. In alternative embodiments, there may be a certain number of sensor elements that must provide measurement data with predominantly low frequency components in order to score a high weight. The image-based detector 104 will not detect a very conclusive pattern that can be classified as a moving target vehicle in the blindzone 16. Therefore, a low weight (e.g. 0 to 2) can be assigned for the image-based detector 104. The time-based detector 106 will determine a high correlation value for measurement data from adjacent sensors since the target vehicle 16 is moving at about the same speed as the host vehicle 10. Therefore, a high weight (e.g. 8 to 10) can be assigned for the time-based detector 106. The cumulative weight for this case is in the range of 16-22, which is high, and an object will be detected in the blindzone 16.

Referring again to FIG. 9C, when there is clutter in the blindzone 16 which is due to a tree shadow, for example, the result is that the sensor elements will detect a high frequency thermal signature. In this case, the frequency-based detector 102 will detect high frequency components in the measurement data for all of the sensor elements. Therefore, a low weight (e.g. 0 to 2) can be assigned for the detector output for the frequency-based detector 102. The image-based detector 104 will detect a random pattern. Therefore, a low weight (e.g. 0 to 2) can be assigned for the detector output for the image-based detector 104. Finally, the time-based detector 106 will detect a low correlation value since the measurement data appears to be random across sensor elements. Therefore, a low weight (e.g. 0 to 2) can be assigned for the detector output for the time-based detector 106. The cumulative weight for this case is in the range of 0 to 6, which is low, and no object will be detected in the blindzone 16.

Referring again to FIG. 9D, when there is a stationary target in the blindzone 16, such as a guard rail, there will be a short spike that is generated in the output of the sensor elements. This kind of sensor output can also happen when posts, a bridge underpass, and the like are in the field of view of the sensor array 12. In this case, the frequency-based detector 102 will detect high frequency components in the measurement data from the sensor elements. Therefore, a low weight (e.g. 0 to 2) is assigned for the output of the frequency-based detector 102. The image-based detector 104 will not detect a pattern that resembles a target vehicle in the blindzone 16. Therefore, a low weight (e.g. 0 to 2) is assigned for the output of the image-based detector 104. The time-based detector 106 will detect high correlation values for short durations for measurement data from adjacent sensor elements since for stationary targets, the same object passes through the field of view of all of the sensor elements and so all of the sensor elements should generate a similar signal that is time shifted across adjacent sensor element. Therefore, a low weight (e.g. 0 to 2) is assigned for the output of the time-based detector 106. The cumulative weight for this case is in the range of 0 to 6, which is low, and no object will be detected in the blindzone 16.

It should be noted that in at least some embodiments, blindzone object detection can be used to detect a person in the blindzone 16 in at least some conditions. However, detection of a person in the blindzone 16 is more challenging when a person's clothing shows a low contrast with respect to the road temperature. While a person's heat signature can be hidden by clothing, it may show up as a low heat signature and be detected.

Furthermore, it should be noted that in the various embodiments described herein, the operation of blindzone object detection will not change if the sensor array 12 is positioned on different areas of the host vehicle 10. However, some of the parameters of the various detection methods may be altered in value depending on the location of the sensor array 12.

It should also be noted that for benign conditions, although the signals produced by the sensor array will be low in amplitude, there should be enough contrast between the road surface and the tires, exhaust and the engine of a given target vehicle to be able to detect the given target vehicle using the various detectors described herein.

In addition, it should be understood that the various detectors described herein can be implemented using hardware, software or a combination of software and hardware.

At least some of the elements of the blindzone detector 100 that are implemented via software may be written in a high-level procedural language such as object oriented programming or a scripting language. Accordingly, the program code may be written in C, C++, or any other suitable programming language and may comprise modules or classes, as is known to those skilled in object oriented programming. Alternatively, or in addition thereto, at least some of the elements of the blindzone detector 100 that are implemented via software may be written in assembly language, machine language or firmware as needed. In either case, the program code can be stored on a storage media or on a computer readable medium that is readable by a general or special purpose programmable computing device having a processor, an operating system and the associated hardware and software that is necessary to implement the functionality of at least one of the embodiments described herein. The program code, when read by the computing device, configures the computing device to operate in a new, specific and predefined manner in order to perform at least one of the methods described herein.

Furthermore, at least some of the methods described herein are capable of being distributed in a computer program product comprising a computer readable medium that bears computer usable instructions for one or more processors. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, and the like. The computer useable instructions may also be in various forms, including compiled and non-compiled code.

It should also be noted that "non-transitory" computer-readable media comprise all computer-readable media, with the sole exception being a transitory, propagating signal and therefore the term "non-transitory" is not intended to exclude computer readable media such as a volatile memory or RAM, where the data stored thereon is only temporarily stored, or stored in a "transitory" fashion.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims.

The invention claimed is:

1. A system for blindzone obstacle detection for a host vehicle, wherein the system comprises:
   a sensor array configured to generate measurement data for a blindzone of the host vehicle;
   a blindzone object detector comprising at least two detectors that each employ a different detection technique, the blindzone object detector being coupled to the sensor array to receive the measurement data, to process the measurement data using at least two separate detection techniques to produce at least two detection outputs and to combine the at least two detection outputs using a fusion detection technique to form a final detection value used to detect an object in the blindzone of the host vehicle; and
   an indicator coupled to the blindzone object detector and being configured to generate an indication of object detection in the blindzone,
   wherein the at least two separate detection techniques comprise at least two of a frequency-based detection technique, a time-based detection technique and an image-based detection technique, wherein the frequency-based detection technique comprises a frequency-based analysis of the measurement data, the time-based detection technique comprises a time-based analysis of the measurement data and the image-based detection technique comprises an image-based analysis of the measurement data using image processing techniques.

2. The system of claim 1, wherein the system further comprises an alarm coupled to the blindzone object detector and the indicator, the alarm being configured to generate an alarm signal when the final detection value indicates detection of the object in the blindzone.

3. The system of claim 2, wherein the alarm is configured to generate the alarm signal when the host vehicle is travelling at greater than a minimum speed.

4. The system of claim 1, wherein the system comprises an early warning alarm that is activated before a detected object enters the blindzone and the early warning alarm has a property that is changed when the detected object enters the blindzone.

5. The system of claim 1, wherein the system is operational when an operator of the host vehicle has indicated a desire to change lanes, reverse the host vehicle or move the host vehicle towards the blindzone.

6. The system of claim 1, wherein the blindzone object detector uses the frequency-based detection technique, the time-based detection technique and the image-based detection technique.

7. The system of claim 6, wherein the frequency-based detection technique uses a Fast-Fourier Transform, the time-based detection technique uses time-correlation and a speed of the host vehicle and the image-based detection technique uses histogram-based detection.

8. The system of claim 1, wherein the blindzone object detector is configured to apply a weight for an output of each detection technique, to add up the weights to determine the final detection value, and to compare the final detection value to a threshold value to detect whether an object is in the blindzone, wherein a given weight is based on a likelihood that the output of a given detection technique corresponds to a detected object in the blindzone.

9. The system of claim 1, wherein environmental data about an environment of the vehicle is provided to the blindzone object detector and certain parameters of the at least two detection techniques are augmented based on the environmental data to improve detection of objects in the blindzone, the environmental data comprising at least one of an indication of whether it is raining, a temperature outside of the vehicle, a time of day, and a level of ambient light.

10. The system of claim 1, wherein the blindzone object detector is implemented by hardware, the blindzone object detector is implemented by software running on at least one processor or the blindzone object detector has a first portion that is implemented by hardware and a second portion that is implemented by software running on at least one processor.

11. A method for blindzone obstacle detection for a vehicle, wherein the method comprises:
   receiving measurement data for a blindzone of the host vehicle from a sensor array;
   processing the measurement data using at least two detectors that each employ separate detection techniques to produce at least two detection outputs;
   combining the at least two detection outputs using a fusion detection technique to form a final detection value used to detect an object in the blindzone of the host vehicle; and
   generating an indication of object detection in the blindzone,
   wherein the at least two separate detection techniques comprise at least two of a frequency-based detection technique, a time-based detection technique and an image-based detection technique, wherein the frequency-based detection technique comprises a frequency-based analysis of the measurement data, the time-based detection technique comprises a time-based analysis of the measurement data and the image-based detection technique comprises an image-based analysis of the measurement data using image processing techniques.

12. The method of claim 11, wherein the method further comprises generating an alarm signal when an object is detected in the blindzone.

13. The method of claim 11, wherein the alarm is generated when the host vehicle is travelling at greater than a minimum speed.

14. The method of claim 11, wherein an early warning alarm is activated before a detected object enters the blindzone and the early warning alarm has a property that is changed when the detected object enters the blindzone.

15. The method of claim 11, wherein the detection techniques are operational when an operator of the host vehicle has indicated a desire to change lanes, reverse the host vehicle or move the host vehicle towards the blindzone.

16. The method of claim 11, wherein the method comprises using the frequency-based detection technique, the time-based detection technique and the image-based detection technique.

17. The method of claim 11, wherein the method comprises applying a weight for an output of each detection technique, adding up the weights to determine the final detection value, and comparing the final detection value to a threshold value to detect whether an object is in the blindzone, wherein a given weight is based on a likelihood that the output of a given detection technique corresponds to a detected object in the blindzone.

18. The method of claim 16, wherein the frequency-based detection technique uses a Fast-Fourier Transform, the time-based detection technique uses time-correlation and a speed of the host vehicle and the image-based detection technique uses histogram-based detection.

19. The method of claim 11, wherein environmental data about an environment of the host vehicle is used to augment certain parameters of the at least two detection techniques to improve detection of objects in the blindzone, the environmental data comprising at least one of an indication of whether it is raining, a temperature outside of the vehicle, a time of day, and a level of ambient light.

20. A non-transitory computer readable medium comprising a plurality of instructions executable on a microprocessor of an electronic device for adapting the electronic device to implement a method of blindzone obstacle detection for a host vehicle, wherein the method comprises:
receiving measurement data for a blindzone of the host vehicle from a sensor array;
processing the measurement data using at least two detectors that use separate detection techniques to produce at least two detection outputs;
combining the at least two detection outputs using a fusion detection technique to form a final detection value used to detect an object in the blindzone of the host vehicle; and
generating an indication of object detection in the blindzone,
wherein the at least two separate detection techniques comprise at least two of a frequency-based detection technique, a time-based detection technique and an image-based detection technique, wherein the frequency-based detection technique comprises a frequency-based analysis of the measurement data, the time-based detection technique comprises a time-based analysis of the measurement data and the image-based detection technique comprises an image-based analysis of the measurement data using image processing techniques.

21. A system for blindzone obstacle detection for a host vehicle, wherein the system comprises:
a sensor array configured to generate measurement data for a blindzone of the host vehicle;
a blindzone object detector comprising at least two detectors that use separate detection techniques, the blindzone object detector being coupled to the sensor array to receive the measurement data, to process the measurement data using the at least two detection techniques and to combine outputs from the at least two detection techniques to form a final detection value used to detect an object in the blindzone of the host vehicle; and
an indicator coupled to the blindzone object detector and being configured to generate an indication of object detection in the blindzone,
wherein, the blindzone object detector is configured to apply a weight for an output of each detection technique, to add up the weights to determine the final detection value, and to compare the final detection value to a threshold value to detect whether an object is in the blindzone, wherein a given weight is based on a likelihood that the output of a given detection technique corresponds to a detected object in the blindzone.

22. A method for blindzone obstacle detection for a vehicle, wherein the method comprises:
receiving measurement data for a blindzone of the host vehicle from a sensor array;
processing the measurement data using at least two detectors that use separate detection techniques;
combining outputs from the at least two detection techniques to form a final detection value used to detect an object in the blindzone of the host vehicle by applying a weight for an output of each detection technique, adding up the weights to determine the final detection value, and comparing the final detection value to a threshold value to detect whether an object is in the blindzone, wherein a given weight is based on a likelihood that the output of a given detection technique corresponds to a detected object in the blindzone; and
generating an indication of object detection in the blindzone.

23. A non-transitory computer readable medium comprising a plurality of instructions executable on a microprocessor of an electronic device for adapting the electronic device to implement a method of blindzone obstacle detection for a host vehicle, wherein the method comprises:
receiving measurement data for a blindzone of the host vehicle from a sensor array;
processing the measurement data using at least two detectors that use separate detection techniques by applying a weight for an output of each detection technique, adding up the weights to determine the final detection value, and comparing the final detection value to a threshold value to detect whether an object is in the blindzone, wherein a given weight is based on a likelihood that the output of a given detection technique corresponds to a detected object in the blindzone;
combining outputs from the at least two detection techniques to form a final detection value used to detect an object in the blindzone of the host vehicle; and
generating an indication of object detection in the blindzone.

* * * * *